US006941576B2

(12) United States Patent
Amit

(10) Patent No.: US 6,941,576 B2
(45) Date of Patent: Sep. 6, 2005

(54) SYSTEM AND METHODS FOR HOME NETWORK COMMUNICATIONS

(75) Inventor: Mati Amit, Zur-Yigal (IL)

(73) Assignee: Texas Instruments Incorporated, Dallas, TX (US)

( * ) Notice: Subject to any disclaimer, the term of this patent is extended or adjusted under 35 U.S.C. 154(b) by 79 days.

(21) Appl. No.: 10/721,568

(22) Filed: Nov. 25, 2003

(65) Prior Publication Data

US 2004/0107445 A1 Jun. 3, 2004

Related U.S. Application Data

(62) Division of application No. 09/548,048, filed on Apr. 12, 2000.
(60) Provisional application No. 60/128,810, filed on Apr. 12, 1999.

(51) Int. Cl.[7] .................................. H04N 7/16
(52) U.S. Cl. ........................ 725/143; 725/74
(58) Field of Search ................ 725/74, 143, 78–85, 725/148–150, 118–120, 127, 129; 333/100; H04N 7/16

(56) References Cited

U.S. PATENT DOCUMENTS

| | | |
|---|---|---|
| 4,534,024 A | 8/1985 | Maxemchuk et al. |
| 4,554,656 A | 11/1985 | Budrikis et al. |
| 4,675,866 A | 6/1987 | Takumi et al. |
| 4,885,747 A | 12/1989 | Foglia |
| 4,935,924 A | 6/1990 | Baxter |
| 5,255,267 A | 10/1993 | Hansen et al. |
| 5,283,789 A | 2/1994 | Gunnarsson et al. |
| 5,351,234 A | 9/1994 | Beirle et al. |
| 5,365,264 A | 11/1994 | Inoue et al. |
| 5,499,047 A | 3/1996 | Terry et al. |
| 5,539,880 A | 7/1996 | Lakhani |
| 5,565,910 A | 10/1996 | Rowse et al. |
| 5,579,308 A | 11/1996 | Humpleman |

(Continued)

Primary Examiner—Vivek Srivastava
(74) Attorney, Agent, or Firm—Abdul Zindani; W. James Brady, III; Frederick J. Telecky, Jr.

(57) ABSTRACT

A system that permits use of existing cable TV wiring for home networking is disclosed. Because of the presence of splitters, notch filters, and other components in the cable distribution system, certain of the premises installations in the system can locally communicate over the same frequency as one another, without interference. In a disclosed embodiment, the cable operator determines the attenuation and isolation among different premises in the system, and then assigns home network frequencies to the particular premises, with those premises installations that are sufficiently isolated from one another being assigned the same home network frequency.

11 Claims, 10 Drawing Sheets

U.S. PATENT DOCUMENTS

| | | | |
|---|---|---|---|
| 5,585,837 A | 12/1996 | Nixon | |
| 5,745,159 A * | 4/1998 | Wax et al. | 725/76 |
| 5,760,822 A | 6/1998 | Coutinho | |
| 5,790,806 A | 8/1998 | Koperda | |
| 5,797,010 A | 8/1998 | Brown | |
| 5,805,806 A | 9/1998 | McArthur | |
| 5,812,930 A | 9/1998 | Zavrel | |
| 5,878,324 A | 3/1999 | Borth et al. | |
| 5,881,362 A | 3/1999 | Eldering et al. | |
| 5,901,340 A * | 5/1999 | Flickinger et al. | 725/149 |
| 5,903,829 A * | 5/1999 | Anderson et al. | 455/347 |
| 6,061,719 A | 5/2000 | Bendinelli et al. | |
| 6,069,899 A | 5/2000 | Foley | |
| 6,081,519 A | 6/2000 | Petler | |
| 6,091,440 A | 7/2000 | Kokkinen | |
| 6,091,932 A | 7/2000 | Langlais | |
| 6,112,232 A | 8/2000 | Shahar et al. | |
| 6,134,223 A | 10/2000 | Burke et al. | |
| 6,166,730 A | 12/2000 | Goode et al. | |
| 6,175,861 B1 | 1/2001 | Williams, Jr. et al. | |
| 6,188,397 B1 | 2/2001 | Humpleman | |
| 6,189,148 B1 | 2/2001 | Clark et al. | |
| 6,195,797 B1 | 2/2001 | Williams, Jr. | |
| 6,209,025 B1 | 3/2001 | Bellamy | |
| 6,282,405 B1 * | 8/2001 | Brown | 725/79 |
| 6,282,714 B1 | 8/2001 | Ghori et al. | |
| 6,452,923 B1 | 9/2002 | Gerszberg et al. | |
| 6,567,981 B1 * | 5/2003 | Jeffrey | 725/80 |
| 6,615,407 B1 | 9/2003 | Inaguana | |
| 6,622,304 B1 | 9/2003 | Carhart | |
| 6,633,545 B1 * | 10/2003 | Milbrandt | 370/252 |
| 6,637,030 B1 | 10/2003 | Klein | |

* cited by examiner

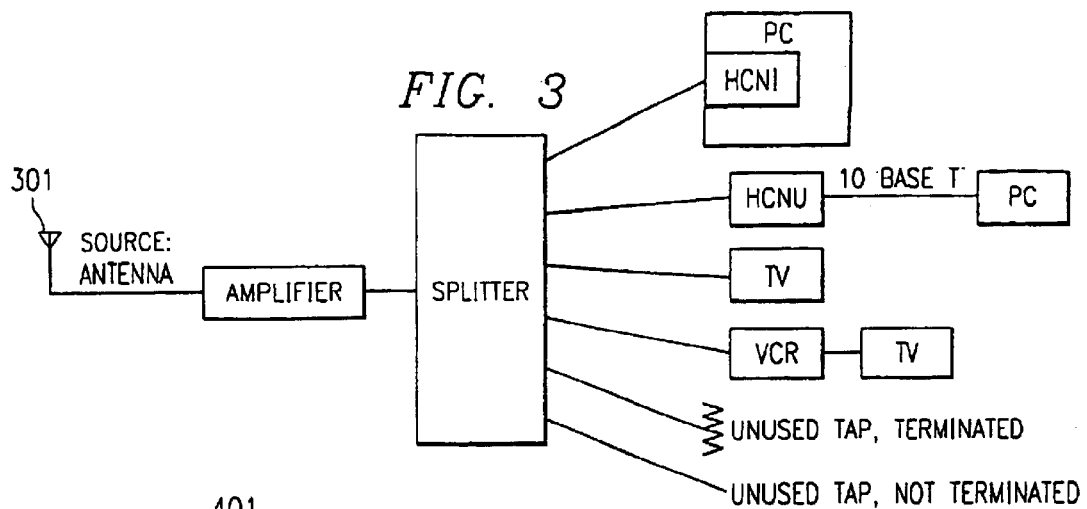
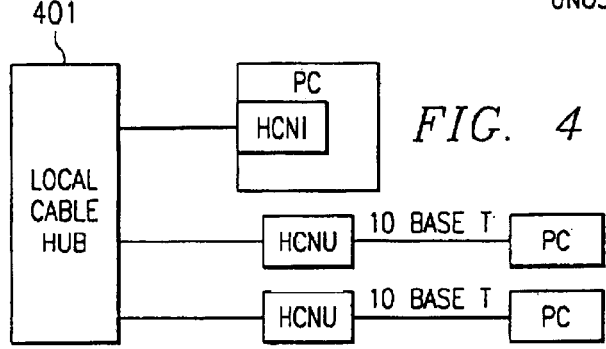
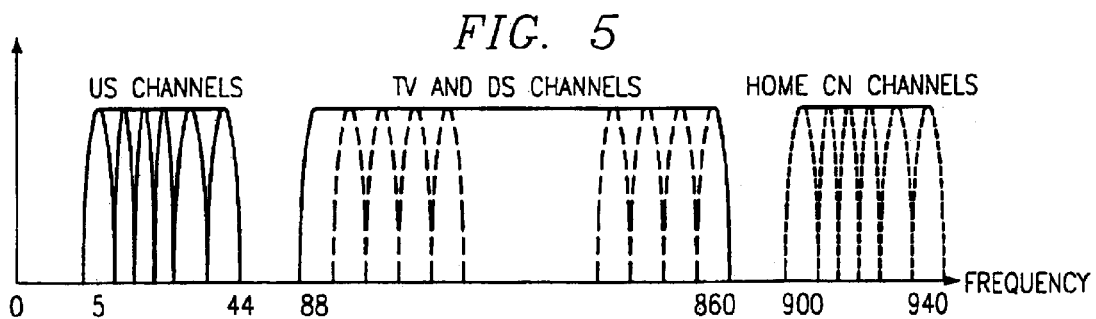
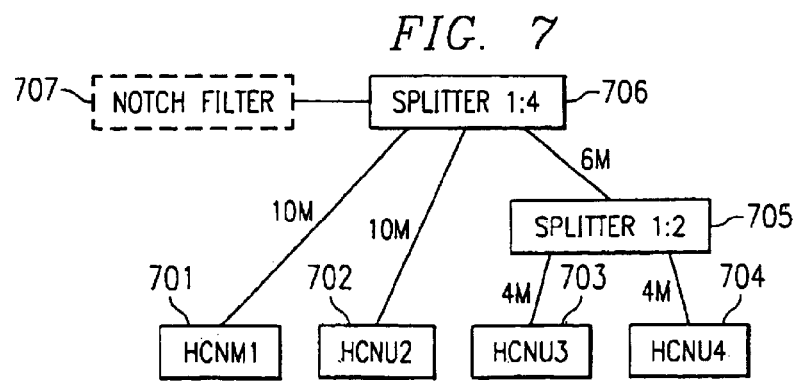

FIG. 10
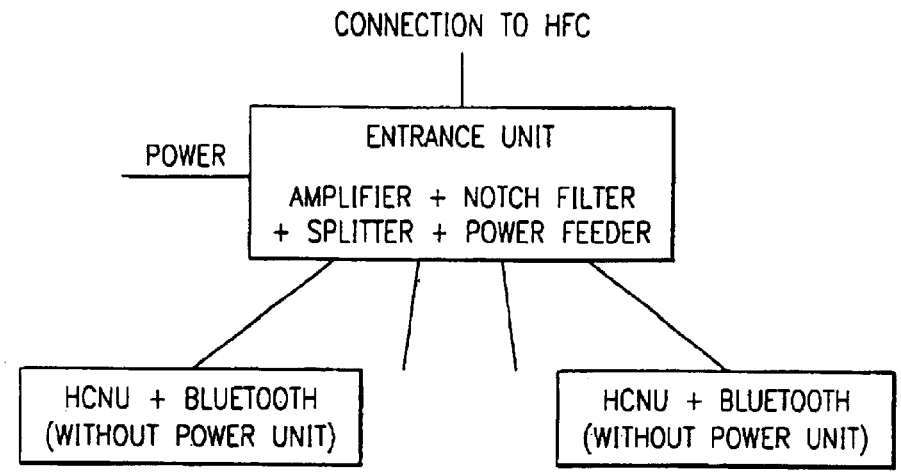
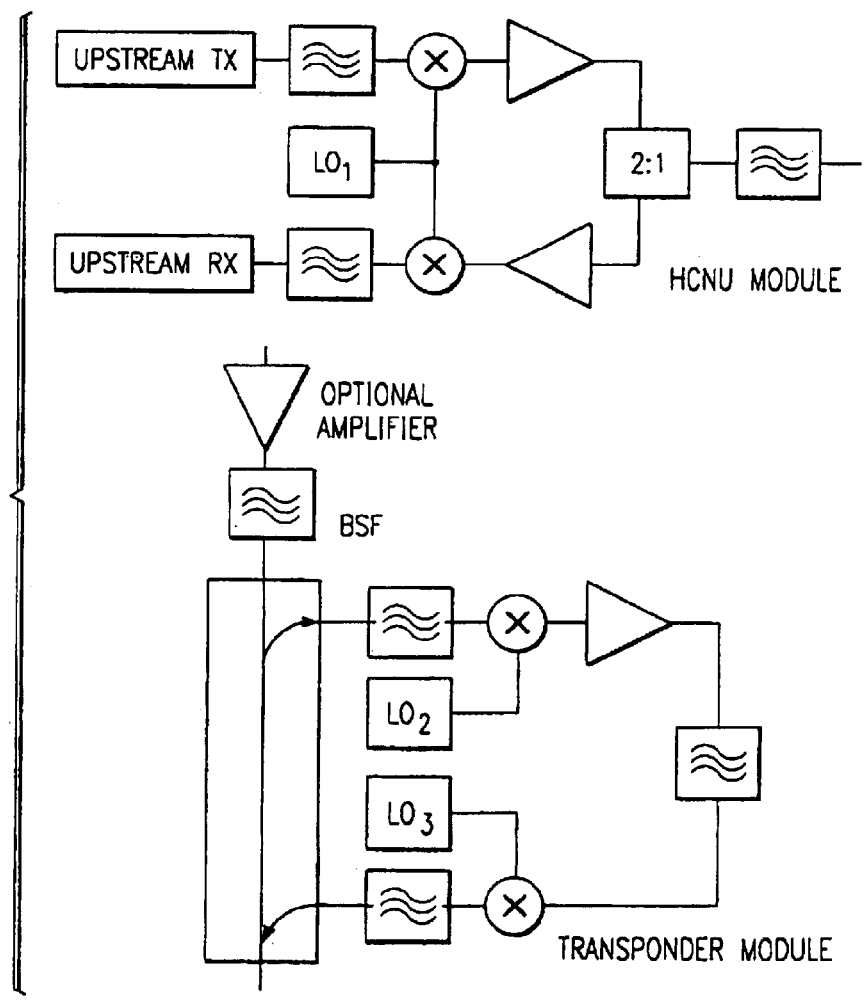
FIG. 11

SYSTEM AND METHODS FOR HOME NETWORK COMMUNICATIONS

CROSS-REFERENCE TO RELATED APPLICATIONS

This application is a divisional of copending application Ser. No. 09/548,048, filed Apr. 12, 2000, and through that application claims priority under 35 USC §119(e)(1) of Provisional Application No. 60/128,810, filed Apr. 12, 1999.

STATEMENT REGARDING FEDERALLY SPONSORED RESEARCH OR DEVELOPMENT

Not applicable.

BACKGROUND OF THE INVENTION

The present invention relates to communications systems, and more particularly, to system and methods for home network communications.

Home networking is a key technology for the evolving home infotainment market, and is expected to itself become a large market over the next decade. Home networks will connect among computing devices (personal computers, palm computers, network computers, etc.), entertainment devices (TV, VCR, DVD player, video camera, audio systems, etc.), I/O devices (printer, scanner, head-sets, keyboards, remote controls, mouse, loud-speakers, etc.), home appliances, and modems (such as cable modems, DSL modems, and PSTN modems) for connecting the home network to external networks including the Internet. The home network will enable a wide range of application such as internet sharing, peripheral sharing, file and application sharing, and home automation. The home network will distribute the computation power of the computer from the study room to the living rooms.

Home networking solutions over existing telephone wiring (e.g., HomePNA) generally allow ordinary voice telephone calls to be carried over the wire, while at the same time providing up to several megabits of data throughput. Because the existing telephony wiring is already in place, these solutions provide an extremely easy and cost-effective way to create a data network in the home. Some solutions require the installing of a gateway where the Public Service Telephone Network (PSTN) interfaces with the wiring in the house. This gateway can also serve as a Voice-over-IP (VoIP) telephony gateway.

Another class of proposed home networking uses the normal AC electrical power wiring in the home for data transmission. Electrical power wiring has been used in the past for low bit-rate data applications such as home automation. Technologies for achieving multi megabit throughput on existing residential electrical wiring are under investigation in the industry. However, this approach has significant challenges, given that electrical wiring is not designed for data transmission. Also, a privacy concern exists where multiple homes are generally served off the same electrical transformer, requiring appropriate encryption to be deployed. Because the electrical wiring is the most ubiquitous in the home and because virtually every digital device in the home connects to the electrical wiring, the use of existing electrical wiring is an attractive way to create a data network in the home.

Wireless technologies, such as short-range wireless (e.g., Bluetooth) and medium range wireless (e.g., HomeRF and IEEE 802.11), are expected to provide several megabits of throughput, and are also proposed as a home network solution. However, their effectiveness can vary, depending on the size of the house, the proximity of other wireless networks, and other sources of noise.

By way of further background, the IEEE 1394 (i.LINK) standard defines a wired serial interface among digital devices. This inexpensive, easy-to-use and high-speed bus handles multimedia bandwidth requirements and provides a universal interface for a variety of devices. By allowing seamless data exchange between devices such as workstations, personal computers and digital televisions, VCRs, camcorders and set-top boxes, it enables a new generation of computers and consumer electronic devices to operate in a common environment. Originally developed as an interface to replace SCSI, IEEE 1394 offers bi-directionality, high data transfer rates and isochronous data transfers. It provides "hot plug" capability i.e. the ability to connect or disconnect equipment with the power on. It also enables devices that require audio, video and control signals to be connected with a single cable. This standard, also referred to as "Fire-wire", requires special wires. The range between two adjacent components is limited, requiring amplifiers to supply the connectivity throughout a house.

For new homes, it is anticipated that standard Category 5 Ethernet wiring can supplement twisted-pair telephone wiring. The added cost of including this extra wiring during construction is relatively low and the benefits reaped can be great, because 100BaseT and other high-speed network types work well over this cable. In existing homes, however, it can be cumbersome to install Cat5 wiring throughout the home.

Another class of existing wiring in the home is TV wiring, consisting of coaxial cables that connect an antenna or a cable TV source to cable outlets or jacks at specific points in the home. Typically, the connection points of coaxial TV wiring are implemented by passive RF splitters. The signals transmitted over the in-home TV wiring may include regular video channels, data channels for fast Internet access (using e.g., DOCSIS cable modem), voice channels for telephony over cable, pay-per-view, control signals and more. Coaxial cable is an excellent communication medium, having a high bandwidth due to its shielding properties.

Coaxial cable TV wiring connect the incoming antenna or cable TV signals, typically via passive splitters, to the cable outlets at specific points in the home. These signals carried over the in-home coaxial TV wiring may include regular video channels, data channels for fast Internet access (using e.g., DOCSIS cable modem), voice channels for telephony over cable, pay-per-view, control signals and more.

Technically, to use the in-home TV wiring for home networking applications, one may connect standard cable modems through the cable TV (CATV) system. In this approach, data from one cable modem can be transmitted to the other cable modem via the CATV head-end. However, this configuration has the drawbacks that it loads the system, possibly beyond the typical headend system capacity, and that it introduces large delays that cannot be tolerated by at least some of the applications. Therefore, it is unlikely that cable operators will adopt this configuration.

By way of further background, conventional cable modems may be used to connect any type of home networking system to external (out of the home) networks, such as the Internet.

SUMMARY OF THE INVENTION

It is an object of this invention to provide a system and methods for communication between subscribers' devices over cable infrastructure that are designed to carry video signals, using pass-band frequency bands, without transmission through a CATV headend device.

It is a further object of this invention to allow very high-speed digital and analog communications within the home and from the home to external devices or networks using low cost devices.

It is a further object of this invention to provide home networking solutions that utilize in-home TV wiring for supplying high rate connectivity between any two home networking nodes, without loading the city cable TV (CATV) network.

It is a further object of this invention to provide such a system and method that utilize the pre-existing CATV inlets and coaxial cable infrastructure that are already present in many residential homes, to obtain the benefits of the coaxial cable as an excellent communication medium, with high bandwidth and excellent noise shielding.

It is a further object of this invention to provide a method and system that allows home networking over these coaxial cables, allowing for very high data rates and a low cost implementation.

By way of definition, the term "Home Cable Network", or "HomeCN", as used throughout this specification, will refer to the system of this invention.

In the prior art (e.g. the DOCSIS 1.0 spec), a CATV infrastructure is utilized for communication between a subscribers' devices (e.g. cable modem) and a headend, thus, two subscribers' devices can communicate via the headend. In contrast, the system and method of the present invention is based on direct communications between two subscribers' devices, without transferring the data via a headend, thus allowing for high data rates between units in a home without reducing the capacity of the regional CATV network.

In the prior art, coaxial cables have been used for local area networks (LAN) and for analog communications. In contrast, the system and method of the present invention is designed for cable networks that carry video, or other information, from a headend or an antenna, and thus it is different from prior art LAN over coaxial cables. Furthermore, the method employs a new digital modulation scheme based on pass-band RF signaling, which is fundamentally different than prior art LAN and analog modulation over coaxial cables.

The present invention enables installation of modems, connected to different types of nodes of the CATV, to enable communication between these nodes. The present invention provides a way to transfer data between these nodes, when the data is not required to be transferred to the headend.

This invention provides these benefits and advantages in a low cost manner, which is very important to mass market implementation.

A summary of some of the principles of the system and methods according to the preferred embodiments of the invention follow:

1. Subscribers' devices communicate directly (not via the headend) using RF signaling over the coaxial cable. These signals will typically propagate between the devices via reflections from other devices, e.g. splitters or amplifiers, that are installed in the line.
2. When the home coaxial cables are connected to a local or regional CATV network, communications are in an out-of-band frequency (i.e., a band that is otherwise not in use, e.g., above 860 MHz), or in part of the downstream band (e.g., within the range of 100–860 MHz) that is allocated (e.g., by the cable operator) for home networking applications.
3. When the home coaxial cables are connected to a local or regional CATV network, frequencies are re-used between portions of the CATV plants, so that the same frequency range is allocated to different users in a CATV plant, relying on the isolation between those users due to the attenuation of the cable plant.
4. The frequency re-use can be improved by adding filters within the signal path in the local or regional CATV network. The quality of the signal transmitted by one subscriber device to another subscriber device can be further improved by deliberately using splitters with high reflections.
5. The home devices may also be capable of connecting to the CATV headend, in the manner as a DOCSIS or DVB cable modem or set-top box. This headend connection may be simultaneous with connections to other devices in the home. Alternatively, the home device may switch between cable modem functionality, on one hand, and connecting to the other in-home devices, on the other hand. Parts of the home device that connect to the headend can be used for both home networking and for cable modem functionality, thus reducing the implementation cost of the home networking functionality. An architecture is proposed in which the home network includes as few as one device that operates both as a cable modem and as a home-networking device. In this architecture, other devices in the home can communicate only over the home network; these other home devices communicate outside the home through the device having the cable modem functionality. Other devices that have home networking and cable modem functionality may also handle a direct connection to other devices in the home. It is contemplated that the home networking functionality can be implemented in cable modems, and particularly in host-based cable modems, as installed in personal computers and that use the processor of the personal computer to perform some of the cable modem and the home cable networking functionality. More generally, the home networking devices may be installed in various kinds of devices that employ general purpose computers (such as a laptop computer, a network computer, a TV, a DVD device, or even certain cellular phones); in this implementation, the general purpose processor performs home networking functionality, thus reducing the implementation cost of home networking capability.
6. In an example of a particular implementation of the method, the home coaxial cables are connected to a local or regional CATV network. Each home device addresses the headend, which in turn assigns carrier frequency and bandwidth to each home network. The maximum power level for each device on the home network is assigned by a home networking device that exists in each specific sub-network. In another implementation of the method, the devices search for a non occupied frequency sub-band within a band that is pre-assigned for home networking, and once such a sub-band is found they use it for their needs. When a home CN device is initialized it is trying to "join its home network", that is trying to communicate with other devices in the same home and adopt their frequency band and protocol.
7. In an exemplary particular implementation of the method, the devices in a home network are based on the IEEE 802.11 MAC layer. This collision avoidance multiple access protocol is in common use, and supports priority levels.

8. In an exemplary particular embodiment of this invention, a special splitter device is present at the input to the user premises, to provide higher quality home networking capabilities. Alternatively, a passive filter may be connected to a conventional splitter, to inhibit interference between signals in that home subnetwork and other neighboring home subnetworks. In either case, the invention provides a "single home" operational mode that allows for low cost equipment and frequency re-use. Alternatively, an active device can be provided that receives signals from a TV antenna or a regional CATV network, also receives signals from subscribers' devices via the home coaxial lines, and functions as a repeater for communications signals between subscribers' devices as well as between subscribers' devices and the headend of the regional CATV network, while still allowing transparent transition of TV antenna or CATV signals into the home.

9. In a particular embodiment of the present invention, the home coaxial network interconnects portions of the home (e.g. rooms or floors), and has terminals as inputs and outputs for wireless connections within these portions.

10. In a particular embodiment of the present invention, one or more of the home cable network devices have an interface to another communication link, such as IEEE1394 link (I.LINK), extending the range of the home coaxial network.

11. In a particular embodiment of the present invention, one or more of the home cable network devices have an interface to another communication link, such as Bluetooth, extending the range of the home coaxial network by supplying pico-cells.

12. In cases where direct communications among home devices is not feasible (e.g., due to a highly balanced splitter that has very low reflections), the home devices may have a fallback option of communicating via a regional CATV headend.

13. The data transmitted in the coaxial home network may be secured (i.e. encrypted).

As used herein, while the term "home network" (or "subnetwork") connotes a local network, it does not necessarily have to be in a home. For example, the home networks may be deployed in an office environment, or in a multi-family residential complex containing several homes (e.g. an apartment building or condominium).

BRIEF DESCRIPTION OF THE SEVERAL VIEWS OF THE DRAWING

The preferred embodiments of the invention as well as other features and advantages thereof will be best understood by reference to the detailed description which follows, read in conjunction with the accompanying drawings, wherein:

FIG. 3 shows an example of the present invention, not connected to a CATV;

FIG. 4 shows an example of HomeCN with a hub;

FIG. 5 presents a frequency allocation that may be employed by the present invention;

FIG. 7 shows a network with a notch filter;

FIG. 10 shows a power supply;

FIG. 11 shows a dual frequency architecture;

DETAILED DESCRIPTION OF THE INVENTION

Figure 1:
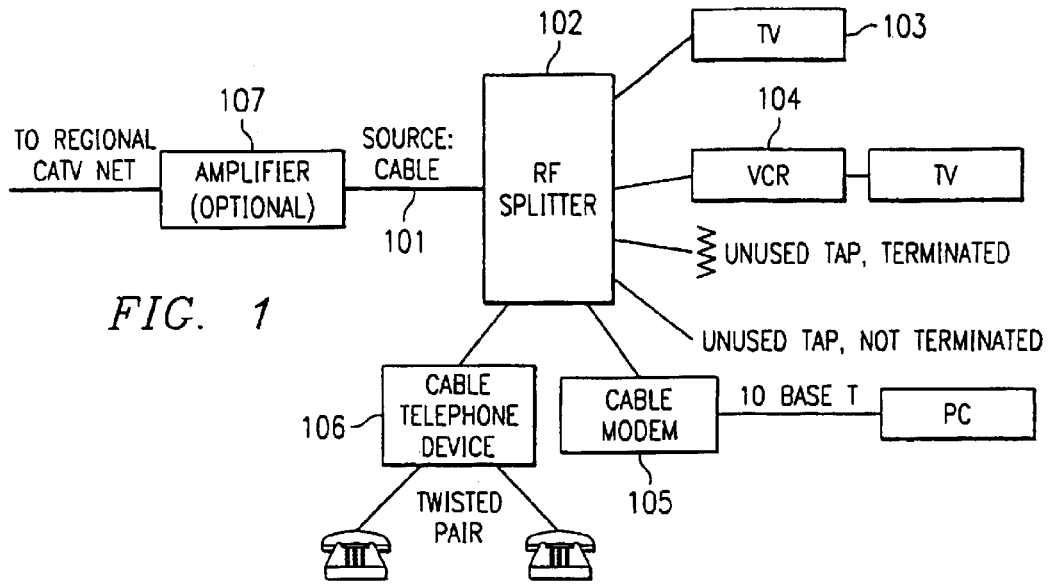
FIG. 1 shows a home that has four nodes inside the home and is connected to a regional CATV10 plant.

FIG. 1 presents the structure of an existing regional CATV network, into which the present invention can be implemented. The typical home coaxial cable infrastructure is consists of a Cable Source 101 which is connected to the home splitter 102 (which may be Customer Premises Equipment, or CPE, in the CATV sense). Some wires connect the interfaces at the home to splitter 102. The components that can connect to the network are TV 103, and a VCR 104 that is connected to TV 103.

Cable Modems (CM) 105, which may be implemented according to the known DOCSIS standard, couples a personal computer to splitter 102 as shown. Cable Telephone Device 106 connects some telephones to the cable infrastructure (e.g. for communications using VoIP protocol over DOCSIS channel).

An amplifier 107 can be added in the entrance of the home/house to increase signal power. If CM equipment exists at home in the network, amplifier 107 should be bi-directional amplifier, amplifying the signal to home side (downstream, or DS) in the 100 MHz–860 MHz frequency range, and amplifying the signal to the headend side (upstream, or US) in the 5 MHz–44 MHz frequency range).

There are some major types of HomeCN components in the home network, as will be described relative to FIG. 2. The Home Cable Networking Interface (HCNI) is a sub-component that supplies a Home Cable Networking interface, and is a sub-component part of specific equipment (e.g. PC, TV, DVD) 204, 205. The Home Cable Networking Unit (HCNU) is a component that supplies connection to the Home Cable Networking, as a separate unit that contains one or more interfaces to the home equipment (e.g. 10BaseT, USB, wireless), and may provide bridging or routing between the home cable network to other interfaces (networks) 207, 212. A Home Cable Networking Modem (HCNM) is a component that includes an HCNU and a cable modem (e.g. a DOCSIS cable modem), supplying a connection to the home cable network and to the CATV headend. This component is usually implemented as a separate unit that also contains one or more other interfaces (e.g. 10BaseT, USB, wireless), and also provides routing among the home cable network, the cable network, and the other interfaced networks 206.

Figure 2:
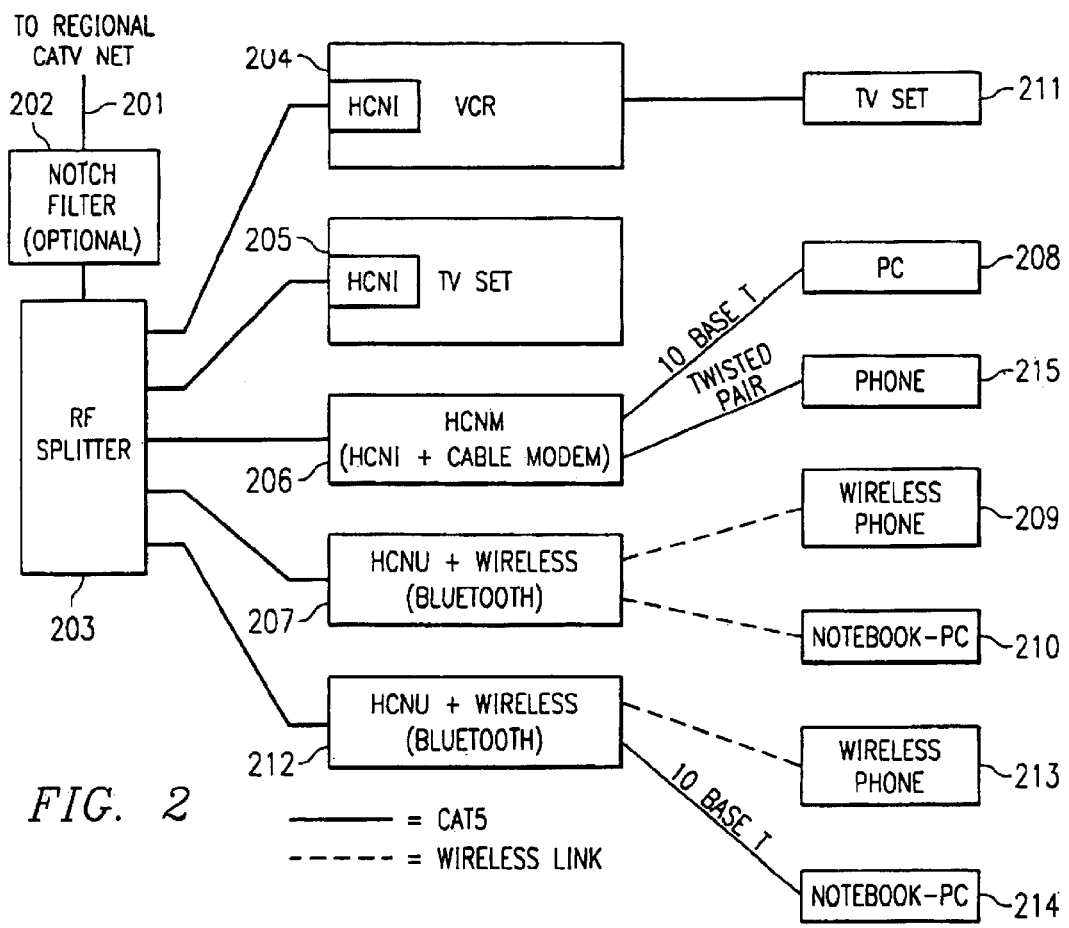
FIG. 2 shows an example of a preferred embodiment of the home network method and system connected to a regional CATV plant.

FIG. 2 shows an example of a preferred embodiment of the disclosed method and system. As shown in FIG. 2, an example of a home cable network ("HomeCN" or "HCN") that has five nodes 204–207, 212 in the CATV network, and that is connected to the regional CATV plants via cable 201. Notch filter 202 is a band reject filter that blocks a certain RF range that will be used by home networking devices 204–207, 212. This filter 202 improves the isolation between the home network and other homes as well as the regional network. In many cases, it is believed that the use of filter 202 will be optional, because it is contemplated that the disclosed system and method will properly function within the isolation levels of the CATV network without the additional notch filtering of filter 202. RF splitter 203 splits the signal coming from and to the regional CATV plant 201, to the signals coming to and from units 204–207, 212, respectively. The signals arriving to RF splitter 203 from the home units 204–207, 212 are partially reflected back to these home units 204–207. It may be recommended to use splitters that deliberately have high reflection levels (although we believe that the method and system can operate with typical commercial splitters). Video Cassette Recorder (VCR) 204 and TV set 205 include Home Cable Networking Interface (HCNI) devices. Personal Computer (PC) 208 is connected to a Home Networking Cable Modem (HNCM) device 206, which supplies both the Home Networking functionality and the Cable Modem functionality. The HCNM is also connected to a phone 215 to supply VoIP functionality. A personal computer that includes HCNI can be connected directly to the HCN. The HCNU+wireless units 207, 212 are connected to the CATV and have a wireless output (e.g. Bluetooth, HomeRF or infra-red) that connects to devices within the vicinity of the device 207, such as wireless telephone unit 209, 213, and notebook computer 210. The HCNU devices are capable of transmitting and receiving digital communications signals among themselves. These signals propagate in the CATV wires and are reflected by the RF splitter 203. The HCNM device is further capable of operating as a DOCSIS cable modem and communicating with a headend of a regional CATV plant 201. The HNCI's, the HCNU's and the HNCM are using Home Cable Network Protocol HCNP.

The HomeCN can also be used to supply full home coverage by the Bluetooth network. To enable this coverage, some HCNU+Bluetooth components 207, 212 that are connected to HomeCN should exist in the home. In this way, a person that travels from room to room with a wireless phone 209, 213 or a notebook computer 210 can remain connected to the network, over the nearest Bluetooth station.

It is contemplated that the method and system of this invention will be capable to perform home networking even if the home coaxial wiring is not connected to a regional CATV plant 201, but is instead connected to a TV antenna, or even has no TV function. However, in such cases, the home network will not allow the capability of connecting the home outside through the CATV system, as done by the HMCM unit 206 in this example.

The HomeCN operation modes are determined according to the existence or non-existence of notch filter 202 at the home entrance. The notch filter in the entrance of the home is a one of the basic element in the home network design. If this notch filter exists the HomeCN is disconnected from the regional cable network, therefore it design is more simple (single home network). When this filter not exists the home network is part of the regional network, therefore it design is more complicated, and some additional functionality is required. According to this preferred embodiment of the invention, the HomeCN supports two operation modes:

Single Home operation mode—This mode requires notch filter 202, or alternatively an amplifier that supplies similar functionality, or can be operated in a system that does not connected to the CATV plant.

Connected Home operation mode—This mode does not require notch filter 202. This mode is more complex and additional functionality. required in the Connected Home operation mode include: Wider frequency operation, frequency selection (Frequency Division Multiplexing, or FDM), multiple bandwidth, privacy, all capabilities be managed by the headend as will be described below.

Notch filter 202 can be a passive component or an active component, perhaps including management and other additional functionality. One example of an additional functionality is interrogation of whether notch filter 202 is present. This query can be used by the HCNP to verify the type of operating mode that should be handled, if the components can operate according to either of the two modes. The use of notch filter 202 will typically reduce the price and improve the performance of the home network.

Preferably, the default operation mode is Single Home. The management system configures the components to the appropriate mode after initialization. The Connected Home operational mode is recommended only if it is managed by the headend (CMTS).

FIG. 3 presents a Home Networking network at a customer premises, that does not connected to the Regional Cable infrastructure. Instead, it is connected to a local antenna 301. This system operates in Single Home operational mode.

FIG. 4 presents HomeCN with Local Cable HUB 401 that connects the HCNUs and the HCNIs. This system also operates in Single Home operational mode.

FIG. 5 presents a typical channel allocation, for example, to provide a system that supplies TV channels, DOCSIS CM (US and DS), and HomeCN channels. In this FIG. 5, some of the HomeCN channels have a different width. HomeCN components that are work in the single home operation mode (reduced mode) are always using the 900–906.25 MHz channel. These components do not support the frequency selection capability, and different channel bandwidth capability.

In the alternative, an additional mode, namely "Dual Frequencies Mode" may be available. In this mode, one frequency range is dedicated to the transmitted information and a different frequency range to received information. In this mode, a transponder at the entrance of the home transfers all the signals that are sent in the transmitted frequency-range to the received frequency-range. The major benefit of this method is a reduction in the influence of the in home echo (For more details see Dual Frequencies Mode appendix below). The HomeCN protocol is defined by specifying the two lower communication layers: the physical layer and the data link layer.

For the Connected Home and Single Home modes, the preferred frequencies and the preferred frequency ranges (bandwidth) are selected according to the operational mode:

|  | Connected Home operation mode | Single Home operation mode |
|---|---|---|
| Frequency range | higher then 860 MHz; usually 900–960 MHz | 900–906 MHz |
| RF channel spacing (bandwidth) | 8 MHz or lower, according to the required rate | 6.25 MHz |

The modulation method is QPSK, QAM 16, QAM 64 or QAM 256 according to the channel conditions, and according to the equipment capabilities. The modulator of the home networking device preferably provides QPSK and QAM 16, and may provide QAM 64 and QAM 256. The modulator preferably provides a data rate of 2,560 ksym/sec., and may provide rates of 160, 320, 640, 1,280, and 5,120 ksym/sec. FEC (Forward Error Correction) functionality preferably supports R-S (Reed Salomon) T=0,10, and may support R-S (Reed Salomon) T=0, . . . ,10. Preferably, the Channel Allocation method is FDM, with a specific frequency for each home network in Connected Home operational mode, as allocated by the management system. The structure of the hybrid fiber-coax (HFC) environment is important for understanding the home networking when the system is in Connected Home operation mode, as this structure is used for enabling frequency reuse, as will be described below.

According to the preferred embodiment of the invention, the HFC system typically includes the components that will now be described relative to the exemplary arrangement of FIG. 6. In this arrangement, headend (CMTS) 601 usually with fiber output. Fibers 602 present in this HFC (Hybrid Fiber Coax) environment connect the headend 601 to the cabinets (Fiber Nodes) 603. The cabinets 603 include fiber to coaxial converters (O-E). Coaxial cable interconnects the different components 604, 606, 607, 610, 611, etc. in the system. Amplifiers 605, 608, 609 increase the signal power, and also filter the frequencies that are not amplified. These amplifiers 605, 608, 609 may or may not include splitters. In each case, the splitters 605, 608, 609, 612, 613, 614, 619, 622 receive a single wire as input, and have multiple output lines. The splitters 605, 608, 609, 612, 613, 614, 619, 622 are divided into two types: Active splitters 605, 608, 609 includes the amplifier, in combination with passive splitters that usually only divide the power between the different ports. The active splitters 605, 608, 609 are usually deployed close to the CMTS (headend) side, while passive splitters 612, 613, 614, 619, 622 are usually deployed in the house entrance and in the flats (near to the home end equipment).

However, frequency resources in the network are limited. Several methods are available to increase the frequency resources. According to the preferred embodiment of the invention, one such method, referred to as Frequency Reuse, enables simultaneous usage of the same frequency by different customers at different premises in the network. In this embodiment of the invention, the "branches" method installs or ensures the isolation of customer groups from one another, permitting these customer groups to reuse the same frequency as one another. This method uses the attenuation characteristic of the existing components, whether inherent in the cabling or installed by way of filters. Some amount of management complexity is involved in this approach, and the cable system operator should be aware of the attenuation and isolation characteristics of its physical infrastructure, both for branch calculation and also for understanding of HomeCN home network conditions. These aspects are required for the HomeCN component and protocol design.

It is believed that the branch calculation of this preferred embodiment of the invention is advantageous over other approaches, including the building of network equipment that supports a wider frequency range, because of the higher price and increased complexity of the components that are required to support such a wider frequency range.

Figure 6:
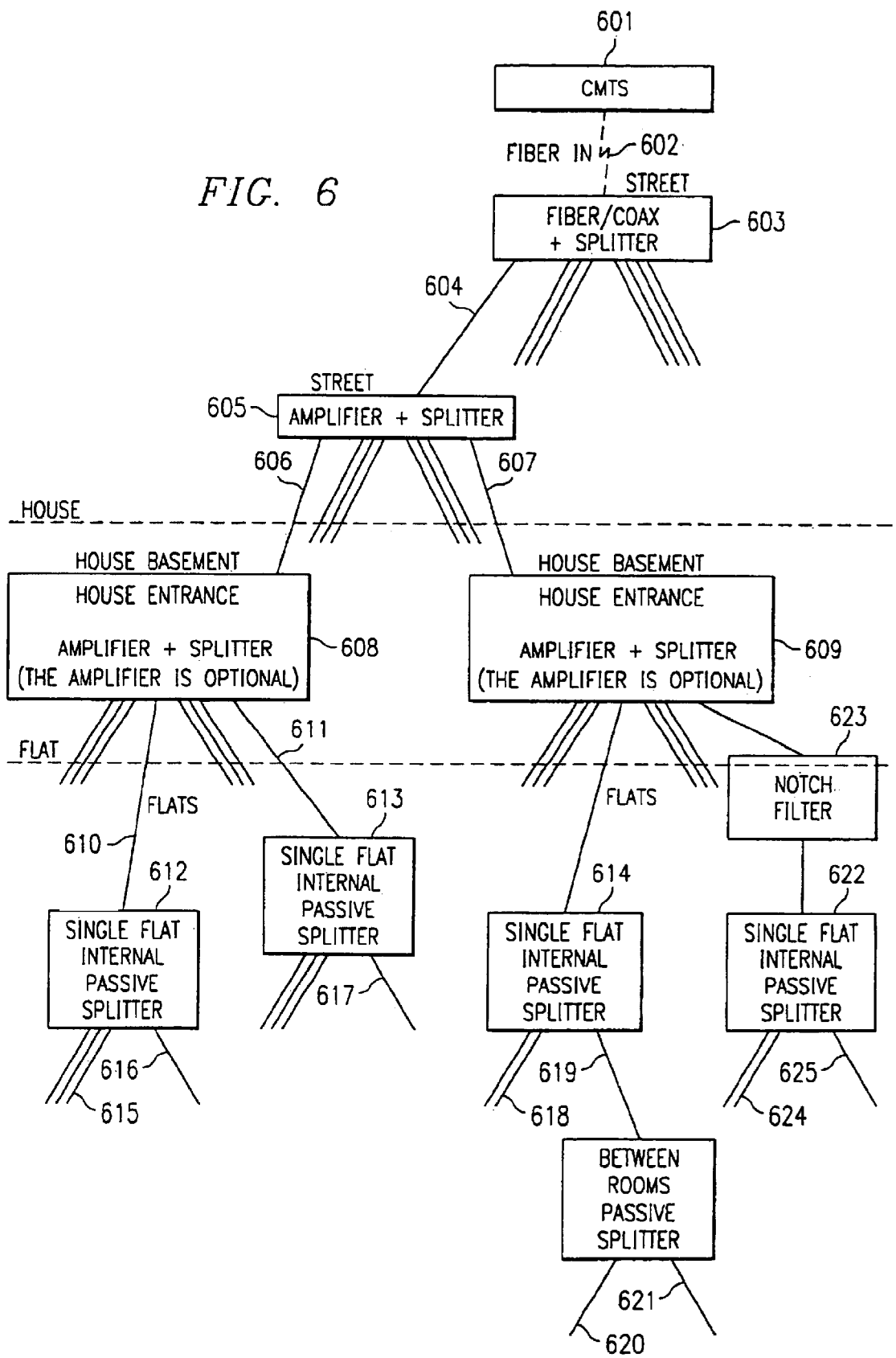
FIG. 6 shows an HFC infrastructure.
Figure 8:
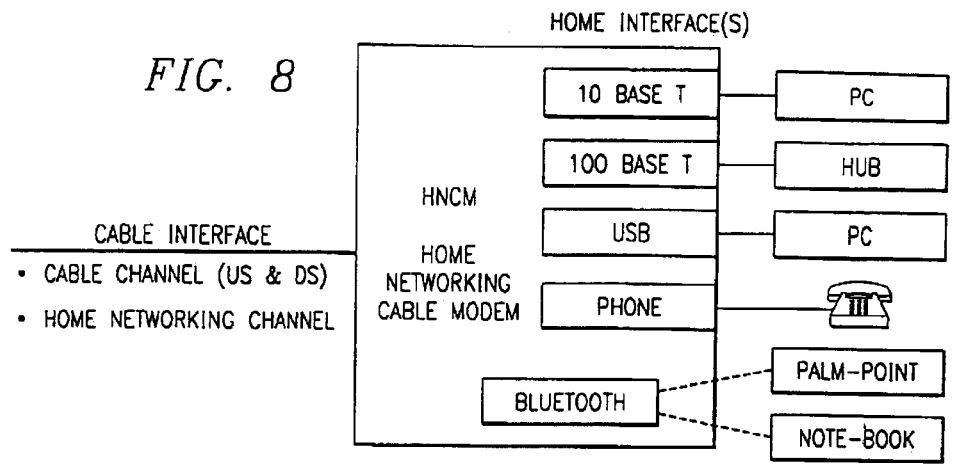
FIG. 8 shows HCNM interfaces.

As shown in FIG. 6, the HFC infrastructure is similar to a tree. This tree build with connection points that supplies isolation between the sub-trees. The components that exist in the network (e.g. amplifiers, splitters, and filters) tend to attenuate the signal, except for amplifiers that amplify signals, to the extent designed to amplify the required frequency in a given direction. The overall attenuation effectively isolates the sub-trees.

As noted above, the key element for efficient frequency allocation to the HomeCN is frequency reuse. To enable calculation of the frequency reuse in a different sub-trees, the term branch will be used. A branch is defined as a sub-network that can use any home networking frequency without interference from another sub-network that exists in another 'branch' and reuses the same home networking frequency. The branches are the key for frequency reuse. Branch calculation should be done before frequency allocation for each HomeCN in the global HFC infrastructure.

The cable network can be divided to 'branches' because of the signal attenuation between branches in the network tree structure. This attenuation results from the coaxial cables themselves, and also by components that include filters. Some of the splitters also provide good isolation between the sub networks that are connected to these components. Because the HomeCN is based on FDM according to the preferred embodiment of the invention, each home has its own frequency range. The ability to supply a reasonable frequency range for each home is based on the network infrastructure and on the ability to reuse frequencies after dividing the network to 'branches'. The size of the 'branches' can be reduced, and the extent of frequency reuse increased, by adding filters in the network. These filters are usually passive filters that are relatively small and can be added easily by the cable operator, or by the user at the home entrance. This mechanism of adding low cost filters at the entrance of a home or flat can be used to define a single home or flat branch, and enables also the Single Home operation mode.

The 'branches' method is very cost effective, and it increase the robustness of the home networking solution. Specifically, the 'branches' approach enables reuse of the same RF frequencies, which enables the manufactures to reduce the price of the home networking equipment, because home networking equipment can support a smaller range of frequencies. In addition, frequency reuse enables the allocation of a larger frequency range for each home or flat, thus supplying higher network capacity: A detailed description of an example of the implementation of this method will now be described.

According to this embodiment of the invention, attenuation and isolation calculations can be done by adding the attenuation of each component and the attenuation of the wire in the required pass and in the required direction. The following table (Table 1) presents the typical attenuation of the basic components

TABLE 1

Attenuation/Isolation Calculation

Figure 21A:
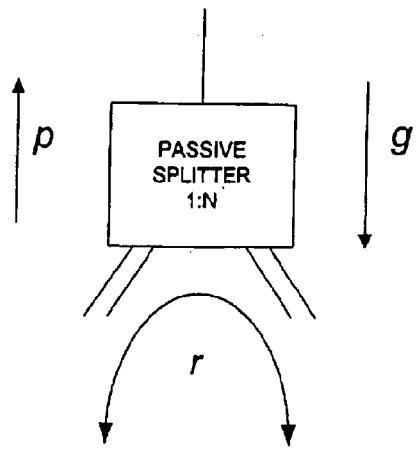
FIGS. 21a through 21c are electrical diagrams, in schematic and block form, illustrating examples of attenuation and isolation parameters for components in the home network system.
Figure 21B:
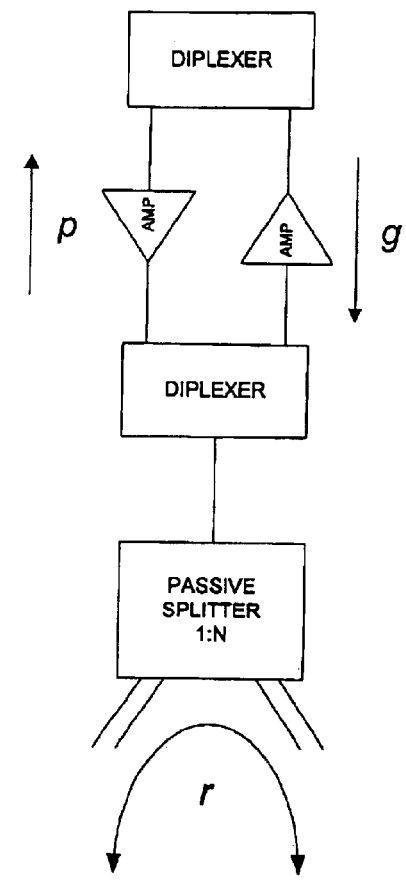
Figure 21C:
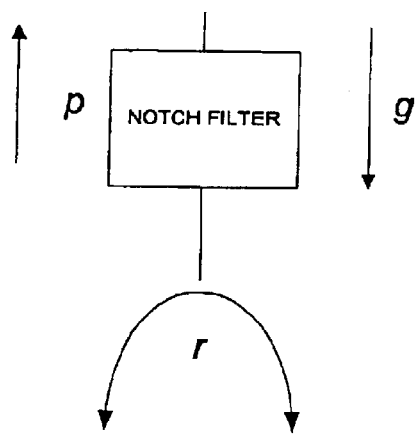

| Component Type | Signal Attenuation [dB] For frequency range of 900–960 MHz |
|---|---|
| Coaxial Wiring | 0.21 dB for meter (RJ 59 type). The exact isolation depends on wiring quality, and attenuation depends on cable length and the signal frequencies used. |
| Passive 1:N splitter (FIG. 21a) | g - Insertion loss: $10\log_{10}(N)$: Theoretical $3(N = 2)$, $6(N = 4)$, $9(N = 8)$ Example of real values $4.2(N = 2)$, $8.2(N = 4)$, $12.5(N = 8)$ P - backward attenuation of downstream amplifier: $10\log10(N)$: 3(for N = 2), 6(for N = 4), 9(for N = 8) r - Isolation: typically 20–30 depending on the quality |
| Active splitter, including two diplexers, amplifiers both directions, and a 1:N passive splitter (FIG. 21b) | g - downstream amplifier gain: $10\log_{10}(N)$: 3(for N = 2), 6(for N = 4), 9(for N = 8), plus amplifying functionality. p - backward attenuation of downstream amplifier: - 55 dB. (Lower when power supply is disconnected. r -: 20–30 corresponding to the quality (higher in better quality) |
| Notch Filter (FIG. 21c) | g - 40–60 dB p - 40–60 dB r - 0.5 dB or 19 dB according to the design |

Components' Parameters

| Component | Parameter | Value [dB] | | | Comment |
|---|---|---|---|---|---|
| Wires (RG-59 RG-6 RG-7 RG-11) | dB/meter | 0.21 | | | |
| Passive splitter | | N = 2 | N = 4 | N = 8 | |
| | Insertion Loss | 4.2 | 8.2 | 12.5 | |
| | Isolation | 22 | 25 | 30 | 20–30 |
| | Return Loss | 11 | 11 | 12 | |
| Notch Filter | Return Loss | 10 | | | |

Following some typical calculations based on FIG. 6 and Table 1, for a system that does not include a notch filter:

Typical loss between two apartments

Case 1. Loss between two modems in the same flat sharing the same splitter [from 615 to 616]:

| | |
|---|---|
| Wires [meters] 20 | 4.2 |
| Splitter Isolation (n = 4) [612] | 25 |
| Total [dB] | 29.2 |

Case 2. Loss between two modems in neighbor homes [from 615 to 617]:

| | |
|---|---|
| Wires [44 meters] | 9.24 10 m [home 612] + 2*12 m [flat to basement] + 10 m [home 613] |
| Insertion Loss (n = 4) [612] | 8.2 |
| Splitter Isolation (n = 8) [608] | 30 |
| Passive splitter Insertion Loss (n = 4) [613] | 8.2 |
| Total [dB] | 55.64 |

The loss between two modems that required to pass amplifier is more then 60 dB, because the amplifier contains filter for the frequencies in the up stream direction.

The capability to calculate the attenuation between two different homes or flats is important for enabling efficient frequency reuse. The cable operator should do the calculation of the "branches". The calculation of the 'branches' can be done by the following methods:

Numerical Calculations—Calculations that are based on a priori knowledge of the cable operator. The cable operator can do calculations that are based on its network structure and its network components.

Defining Basic Rules—The operator can define some base rules that usually work, and divide the network to branches according to these rules. Examples of rules include i) each port that connects directly to a filter/amplifier unit specifies a "branch"; and ii) Homes and flats that are connected using passive filters are on the same "branch".

Measurements using special equipment—The cable operator can use spectrum measurement equipment. This equipment will usually be used to enable the cable operator to define the rules according to its own infrastructure.

Measurements using HCNM Branch Calculation Mode The cable operator can use a specific mode of the home networking equipment that enables 'branch' calculation. This mode will now be described in detail.

Each HCNM should have a specific HCNM Branch Calculation Mode that enables the management system to calculate each 'branch' member. This mode would permit the operations of: i) locking on a specific frequency and specific frequency range; ii) transmitting a signal of a known pattern at a specific power for a specific period; iii) measuring the power of the input signal, at the known pattern and over the known measurement period. The algorithm is based on the structure of the cable infrastructure. A tree data structure is built in the computer memory. This tree data structure represents the existing infrastructure, and is built according to a set of rules, an example of which includes:

Tree nodes are the splitters (the splitters can be active or passive). The splitter capability to isolate between two sub-trees is saved as data in these nodes.

The leaves are the CM, HCNM or HNO. The identification of these nodes is saved in these leaves.

The main process is to build the topology database. This process can be done by either:

Loading the tree structure from the cable operator database. This process is simple but may require an updated database to comprehend changes over time.

Automatically generate the tree structure based on measurements of the isolations between two components using the HCNM—Branch Calculation Mode described above.

These calculations can be complex, and are based on prior assumptions. The basic idea of automatic tree building is to calculate the isolation between two leaves. If the some leaves have similar isolation between themselves they can be connected to the same nodes. If there are two leaves with the same isolation, and an additional leave that has a higher isolation this leave connect to the previous two leaves using additional higher level node.

In either case, after building the topology database, it is required to verify that the nodes contain the isolation values. These values are usually loaded in the previous stage, but if this information was not entered, the system can operate according to the Branch Calculation Mode to find the isolation of the nodes. It is believed to be difficult to calculate these numbers when the tree is calculated automatically, because the splitter supplies different isolations between the wires that are connected to the same node.

This 'branch' specification is based on the data structure that was built in the above method. Each 'branch' is specified by the isolation between itself and the other "branches", which is sufficient that the networks and systems in two different 'branches' can use the same frequency with at most negligible interference. Therefore, a 'branch' is defined where its isolation is better than a minimum isolation threshold value between itself and the other 'branches'. When the isolation value in the tree nodes (or in summary of some layers that does not include leaves) is grater then the specified threshold all the nodes that are member in the specified sub-tree will be defined as nodes in a specific 'branch'.

When the system is not occupied as a balanced tree, the 'branch' calculation might be less effective. In this case, it might be required to divide the frequency range to some sub-ranges, and define a 'branch' for each one of them. The algorithm for these calculations will not be specified in this document, because we do not think that the common network includes such complex structure. It is contemplated that those skilled in the art having reference to this specification will be readily able to extend this methodology to this situation.

In addition, the cable system operator can add filters or special splitters to reduce the branches' size.

To use the Single Home operation mode, and to take advantage of the simplified network equipment that may be available in this mode, a notch filter should be added. This filter can be added at the flat/single user home entrance, and may be added by the end user without requiring a technician visit. The filter may also be inserted by replacing the house basement splitter that split the signals between the flats to a special splitter, which is advantageous in that the system operator can implement a special splitter that includes internal filters, resulting in more effective usage of the home networking for some flats or homes. However, if the HomeCN network uses notch filter reflection to communicate within its own network, the attenuation and delay of the coaxial cable between the flat and the central splitter will have a negligible influence.

Referring again to the home network itself, the attenuation between two points at home (and the range of these values when there are more then two points) determines the quality of the equipment that should be use for HomeCN networking. Various radio frequency (RF) challenges are presented in designing the HomeCN network components. One problem is the "hidden nodes" problem, which exists when the isolation difference between two different nodes is different then the isolation between other two nodes. It is expected that this problem will most likely exist in a home that contains some splitters, but no notch filter. Hidden nodes can exist where the attenuation between two HCNU elements is low, but where the attenuation between each of these two HCNU elements and a third HCNU element is high. Referring to FIG. 7, an example of the hidden node problem is the case where communication between HCNU 703 and HCNU 704 is hidden from HCNU 701, especially when optional notch filter 707 is not present.

Another challenge is the potential of high reflection at the notch filter. If the power of the reflection from the notch filter is higher than the incoming signal, the reflection can serve as the main signal.

The following calculations are based on table 1 and FIG. 7. These calculations are only valid for homes that have notch filter.

| Home Networking Typical Calculations Loss between two modems in the same flat | |
|---|---|
| Case 1 Connected to the same main filter HCNM1 [701] HCNU2 [702]: | |
| Without Notch Filter | |
| Wires [20 meters] 20 | 4.2 |
| Splitter Isolation [706] | 25 |
| Total [dB] | 29.2 |
| Echo form the notch filter | |
| Wires [20 meters] 20 | 4.2 |
| Insertion Loss (N = 4) [706] | 8.2 |
| Return Loss [707] | 10 |
| Insertion Loss (nom) [706] | 8.2 |
| Total [dB] | 30.6 |
| Case 2 Connected to the same minor filter HCNU3 [703] HCNU4 [704]: | |
| Through the nearest splitter | |
| Wires [8 meters] | 1.68 |
| Splitter Isolation [705] | 22 |
| Total [dB] | 23.68 |
| Echo from the notch filter | |
| Wires [20 meters] | 4.2 |
| Insertion Loss (N = 2) [705] | 4.2 |
| Insertion Loss (nom) [706] | 8.2 |
| Return Loss [707] | 10 |
| Insertion Lost (nom) [706] | 8.2 |
| Insertion Lost (n = 2) [705] | 4.2 |
| Total [dB] | 39 |
| Echo from Main Splitter | |
| Wires [20 meters] | 4.2 |
| Insertion Loss (N = 2) [705] | 4.2 |
| Return Loss [706] | 11 |
| Insertion Loss (N = 2) [705] | 4.2 |
| Total [dB] | 23.6 |
| Case 3 Connected to different filters HCNM1 [701] HCNU2 [704]: | |
| Without Notch Filter | |
| Wires [20 meters] | 4.2 |
| Splitter Isolation [706] | 25 |
| Insertion Loss (N = 2) [705] | 4.2 |
| Total [dB] | 33.4 |
| Echo from the notch filter | |
| Wires [20 meters] | 4.2 |
| Insertion Loss (nom) [706] | 8.2 |
| Return Loss [707] | 10 |
| Insertion Loss (nom) [706] | 8.2 |
| Insertion Loss (N = 2) [705] | 4.2 |
| Total [dB] | 34.8 |

The CSMA/CA can be used with or without ACK protocol. The need for immediate ACK should be verified according to the quality of the infrastructure. The security is only required in Connected Home operational mode The security that is required in this protocol is the base on IEEE 802.11 or on line privacy plus. The specification for line privacy plus protocol is presented in DOCSIS 1.1. The management of the security keys can be done by the CMTS. Home networks that works in Connected Home operational mode and are not connected to the CMTS will use a single key.

The priority is integrated in Layer two MAC. A HCNM has at least two physical interfaces, namely the HCNM interface to the cable side, and the HCNM interface to the network side. The HCNM receives information from these channels/interfaces simultaneously. For the HCNM interface to the cable side, the single physical interface contain two data channels (that use different frequencies). A first data channel is the cable modem channel (e.g., DOCSIS), which contains an up stream subchannel (US) and a down stream (DS) subchannel. The second data channel is the Home Networking channel, which is a single channel used for sending and receiving information.

The HCNM interface to the home side may be a a single interface or may contain multiple interfaces. These interfaces are connected to the equipment within the home. Examples of the interfaces include Ethernet (10/100/1G BaseT) (or some Ethernet ports), USB, Phone connection, Bluetooth, wireless, Typically, the HCNU and the HCNI components do not contain the Cable Modem Channel. An HCNI that is designed as host-based, i.e. a card that inserted into the PC and connected to the PCI bus, may implement the HCNM functionality, however.

The HCNM bridges messages between the home interface to these cable channels and vice versa. In addition it might support the capability to bridge information between cable modem channel to the home-networking channel and vice versa (This capability is only required when HNO components exists).

The following table describes the bridging requirements for HCNM:

| Bridging Type | Description |
| --- | --- |
| Cable Modem Channel - Home Interface | According to cable modem standard's specifications. |
| Home Networking Channel - Home Interface | Bridge the messages between the stations at the home networking and the stations that are connected to the HCNM home interface(s). |
| Cable Modem Channel - Home Networking Channel | Bridge the messages between the Cable Modem Channel and Home Networking Channel in the following conditions: This component was configured to do Cable Modem channel - Home Networking channel bridging; and The message should be transferred between Cable Modem Headend system and HNO component |

Figure 9:
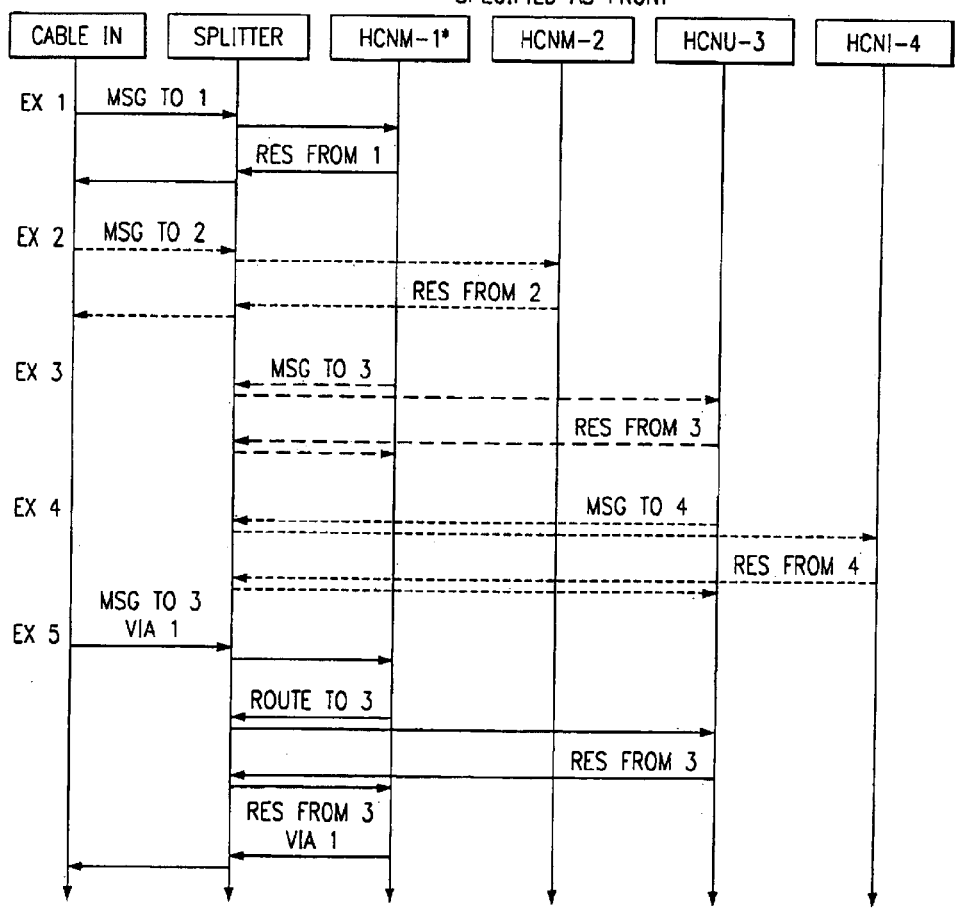
FIG. 9 shows representative HCN data flows.

Referring now to FIG. 9, several examples of data flow will be described. In Examples 1 and 2, which pertain to a standard cable modem protocol, messages are sent from the cable headend to HCNM 1 and HCNM 2, respectively, and the returned response is illustrated. Examples 3 and 4 illustrate messages from one component in the home network to another, and the corresponding responses. In these cases, messages from the home equipment are transferred to the splitter, the splitter distributes the energy to the Cable-In connector and to the other output connectors that are connected to the splitter. The destination-component the receives the message and returns the response. In Example 5, a message from the Cable headend to HCNM 3 through HCNM 1, which was specified as the front router of those components that exist only in the home network. This message arrives at HNCM 1, which identifies the destination and its duty as router, and which routs the messages to HCNU 3. The response is transferred in the opposite direction, in the same manner. In this arrangement, if HNCM 1 fails, HNCM 2 can be configured to take its duty automatically.

The purpose of the home networking system is to transport Internet Protocol (IP) traffic through the HomeCN system. The Network Layer protocol is the IP [RFC-791].

The home networking management can be done by two methods: local management done at the home premises, and central management. Local management is always used in the Single Home operation mode, and can be used when the house is not connected to the cable infrastructure, or when the house has isolation (for the home networking frequency) from the cable network and the headend does not support the home networking management capability. However, local management may not include all the capabilities that the central management supports Central management is management from the headend, and performed by the cable system operator. This approach is preferred for the Connected Home operational mode. This central management uses the standard cable modem interface (e.g. DOCSIS interface). The configurations of the HCNU and HCNI can be done by the headend via HCNM routing capabilities.

There are some options for power supply to the HomeCN units. Most of the HomeCN components will use local power supply. The special unit is a HomeCN component that its only interface is wireless (i.e. Bluetooth). For this type of unit, that required very low power consumption, a central home power supply can be added. The central power supply is a special HomeCN splitter that may contain one or more sub units, such as notch filter, a passive splitter, and a power supply that enable units to gets its power from the home cable infrastructure, as shown in FIG. 10.

The preferred embodiments of this invention provide home networking solutions that utilize the in-home TV wiring, supplying high rate connectivity between any two home networking nodes, without loading the city cable TV (CATV) network. This invention also enables the installation of modems, connected to different nodes of the CATV network, that enable communication between these nodes, without requiring the data to be transferred to the CATV headend. These functions can be implemented at relatively low cost, which enables its use in the mass market.

The major driving force behind creating new home connectivity products is the growing number of homes with two or more PCs. While Local Area Networks (LANs) constitute a well-accepted part of the communications environment for businesses, LANs infrastructure is not commonly deployed in the home. This is due to several technical and logistical reasons that were described above relative to the Background of the Invention. In general, prior home networking systems are designed using the existing copper-based (twisted pair) wiring or using wireless solutions. This invention provides a system and apparatus for home networking over the in-home TV wiring that connects the antenna or the cable TV to the TV sets in the home.

It is contemplated that this invention facilitates several key applications that drive the demand for home networking. These applications include Internet sharing, peripheral sharing, file and application sharing, entertainment including multi-player network games, home automation including environmental control and security systems, voice and video over IP and the like.

It is further contemplated that this invention provides the capability for these applications without requiring mastery of Ethernet networks and protocols, or the drilling of holes and running of wires through walls of the home. Further, this invention provides these advantages at a low cost, with adequate range for a typical home, and high data rate performance. In addition, it is contemplated that this invention is capable of growing without rendering existing devices obsolete. Still further, the radiation from the coaxial cabling used in this invention is very low, if not negligible.

Security functionality is provided to keep the network data private within the home unit, and the network does not interfere with other systems, appliances, and services. This is because the home networking equipment coexists with other services on the cable network, by being spectrally aligned with the television and other signals on the coaxial cable, so that harmful interference to any other services that are assigned to the cable network in spectrum outside of that allocated to the home networking is prevented. Specifically, the networking should not interfere with any cable modem channels.

It is contemplated that some amount of management by the cable system operator to verify that the technology does not limit the number of cable modems or the number of home networking modems. Due to using HNCM technology, each home can include more than a single CM. The cable headend should support the increased number of cable modems. For example DOCSIS protocol can support high quantity of CM's (up to 8,000 CM's for a MAC chip) in particular DOCSIS 1.1.

The Home Networking (HN) preferably supplies a scaleable bandwidth range (100 Kb–10 Mb and greater). The number of nodes that are connected to the home network should not be limited by the presented solution. The only limitation should be the identification method in layer two (e.g. the limitation of using MAC address).

The connection method and the connection rate from home to the Internet using any technology (e.g. xDSL, cable modem) should not be influenced by the home networking technology. The only difference may be the ability to use this Internet connection for central management. For example, the Ethernet protocol, as a home networking protocol, is an example of a conventional technology that complies with this requirement, because it does not create any limitations to the protocol that is used for connecting the home to the Internet. In contrast, the HomePNA is a home networking protocol that adds limitations and does not comply with this requirement. HomePNA enables the G.Lite protocol to be used for connecting the home to the Internet, but it does not enable the use of ADSL (10 Mbps) or VDSL protocols because it uses the same medium (phone line) and the same frequencies.

It may be desirable to create a component that supplies the functionality of home networking according to this invention, but that does not supply the functionality of connection to the Internet. For example, Home Networking might be able to operate without connection to the headend.

It is desirable for this protocol to use only limited "cable" resources. The protocol preferably does not use the limited US (up stream) frequencies, but rather uses some of the DS (down stream) frequencies, or frequencies higher than the conventional DS frequencies, even if the distances of such high frequencies are limited.

Figure 20:
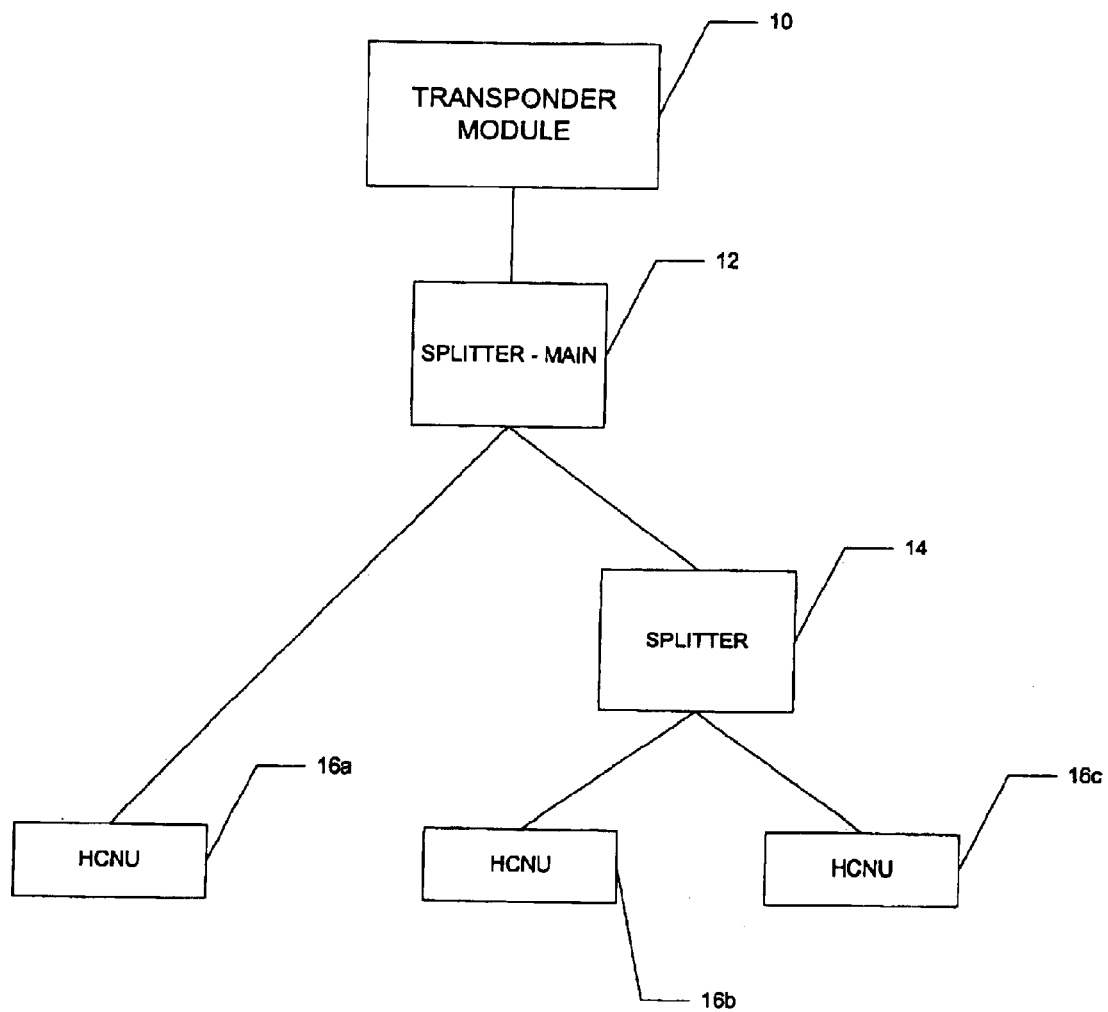
FIG. 20 is an electrical diagram, in block form, of a home network architecture that operates according to a two-frequency mode.

According to these and additional embodiments of the invention, a two-frequency mode eliminates the echo problem that may otherwise exist in some of the home installations if a single frequency mode were used. In this approach, the information is transmitted in one specific frequency range (e.g. 900906 MHz) and received in a different frequency range (e.g. 910916 MHz). As shown in FIG. 20, the architecture of this solution includes transponder module 10 that resides upstream (toward the CATV headend) from main splitter 12 in the home network. In the single frequency mode, information transferred from one HCNU 16a, 16b, 16c to another is reflected from one or more of the splitters 12, 14. In the dual frequencies mode, the signal from the transmitting HCNU 16 is received by the upstream transponder module 10, which changes the signal frequency from the US frequency to the DS frequency and transmits it to back into the home for receipt by the destination HCNU 16, with no echo. It is contemplated that transponder 10 is a simple one that translates the input frequency to another, either by way of an up and down conversion or another technique such as conversion to baseband and back.

The HCNU can support the two modes, and according to the configuration the operation mode will be specified. The configuration can be done manually or automatically by verifying is the transponder exits (by sending a signal in the US channel and verifying if the signal arrived in the DS channel). Therefore, this module can be inserted in houses were there is a problem with reflection.

There are some additional benefits in this two-frequency mode, including that the transmission path has low insertion loss and negligible reflections. In addition, the transponder module can be inserted with a notch filter and with an amplifier, if desired, providing flexibility in implementation. In addition, it is contemplated that the transponder can be powered down (even remote) and the system returns to the initial model, this ability maybe very important to the cable operator.

Other applications can also be operated according to this embodiment of the invention, using the same physical layer. These applications include those applications that can be built on the same infrastructure, including the transporting of variety classes of layer two protocols through the home cable infrastructure. These applications are based on a home networking layer one described in this specification, and use the specific application layer two. The HomeCN-P is a protocol that includes layer one and two. While it may be possible to transfer different layers two over layer two of the HomeCN-P, it is preferred, according to this embodiment of the invention, to transfer different layers two using the same layer one.

Examples of layer two protocol that can be used in connection with this embodiment of the invention include USB, IEEE 1394 (Fire-Wire), Ethernet (10BaseT, 100BaseT), and wireless techniques.

Figure 12:
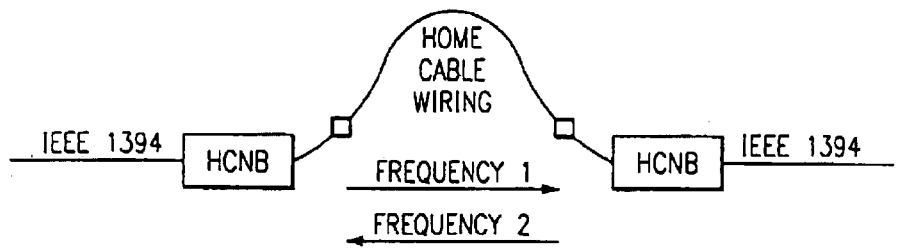
FIG. 12 shows layer two transporting over a home network using dual frequency components.
Figure 13:
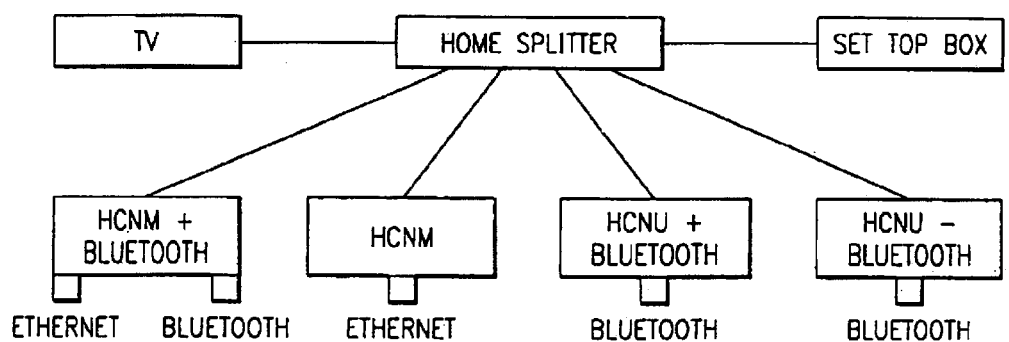
FIG. 13 shows a Bluetooth home network.

The system illustrated in FIG. 12, according to another of the preferred embodiments of the invention, enables high rate connection between two points at home. The system contains two Home Networking Bridges (HNB) that are connected through the home cable wiring, each one of them has the same layer two interface e.g. IEEE 1394, as shown. This structure enables information sending in very high rates (e.g. 40 Mbps) for each direction, and does not require a burst modulator/demodulator but can use a standard modem. As known in the art, the Bluetooth technology is designed to supply wireless connectivity among components that are located in the same area, such as less than 10 meters. For a home network that is larger then a small flat, additional components may need to be connected differently if the distance between them is larger then 10 meters. For example, an arrangement such as shown in FIG. 13 provides a simple and cost-effective way to enable Bluetooth functionality to cover a larger range. In addition, the location of the cable infrastructure port in a given room is less important, considering that the entire room is "covered" by the Bluetooth network.

The HNO-Bluetooth can be a very simple component if the network is required to have at least one component of HCNM+Bluetooth that has the capability to manage the simple HNO-Bluetooth components. The management of the Bluetooth sub-networks and the ability to transfer the connection of a network element from one Bluetooth sub-network to another required a specific: layer two Bluetooth rooming-in protocol. Adding power-supply capabilities to the home amplifier, as shown in FIG. 10, enables very simple Bluetooth-CM components in the network. Each Bluetooth-CM component is required to include the following: Tuner, CM-chip, Bluetooth-chip, and at least a very small CPU (only is the CM-chip and the Bluetooth-chip does not contain CPU). Installation of the Bluetooth-CM is simple, requiring simply plugging the Bluetooth-CM to the cable interface, with no other wire are required. The BOM of this component is going to be very low.

When the system is working in a single home operational mode and a notch filter exist, all the management is done local and the requirements from this management system are reduced. Conversely, when the system is working in a Connected Hone operation mode, and the system contain a CM channel, the management is done from the headend. This management is much more complex. The following table presents the management functionality:

Management Functionality

| Functionality | Description | Operation Mode |
| --- | --- | --- |
| HCN unit identification | Identify all the units that are sharing the HCN | All |
| Ranging | Ranging between each two modems | All |
| Headend management | Enabling management from the headend. | Connected Home only |
| Frequency Selection and frequency plan | Select the required frequency for HCN and required frequency range | Connected Home only |
| Security | Management of the BLP (Base Line keys | Connected Home only |
| Support Branch Calculation Mode | Support the ability to measure the signal amplitude according to the command of headend | Connected Home only |

The frequency planning mechanism according to the preferred embodiment of the invention, in the Connected Home mode, will now be described in detail. The configuration for the specific frequency will be dome by the management system. The calculation is based on the 'branch' calculation, because the process of frequency allocation is done separately in each "branch". According to this embodiment of the invention, certain base rules are used in the calculation of each home-network frequencyrange:

The home-network frequency-range is specified by the required home-networking bandwidth. The required bandwidth is specified for each home-network separately. For example, the home-network frequency-range required to transfer 40 Mbps is 6 MHz.

The total frequency-range is specified by the capability of the home networking equipment, for example on the order of 40 MHz. In any case, the total frequency-range should be larger then the summaries of the home-networks frequency-range of all the home-networks that are exist in each "branch". If this condition cannot be met, the cable operator can decrease the bandwidth of its customers, or divide the network into smaller "branches". For example, if a 'branch' contains 16 flats and each one of them ask for the higher bandwidth and the total frequency-range is 40 MHz, each one of the flats can get 40 MHZ/16=2.5 MHz home-networks frequency-range. The operator can also divide the total frequency-range in other method, 4 flats will get 5 MHz each, and the other 12 flats will get 1.6 MHz each.

Certain frequency-ranges are contemplated to be useful in connection with this embodiment of the invention. The preferred frequency range is higher than 860 MHz, to avoid DOCSIS and TV channels. There are some existing conventional chips at relatively low price that supply two-direction filtering and tuner functionality for the specific 900–1000 MHz frequency-range; these chips were designed for the cellular market. The following table presents a comparison among these frequency-ranges.

Frequency Ranges

| Frequency Range | Advantages | Disadvantages |
| --- | --- | --- |
| <5 MHz | Not used by DOCSIS or TV. Tuners are not required. Low attenuation of the coaxial cable enables low power. | The capacity is very low. The quality of this frequency-range is low. The cable network contains amplifiers for part of this frequency range. These amplifiers are designed to amplify in the US direction, and therefore the segmentations to branches are limited. Low attenuation of the coaxial cable increases the size of branches. |
| 5–42 MHz | Tuners are not required. Low attenuation of coaxial cable enables low power | DOCSIS channels use this range. The frequency-range resource is very limited The cable network contains amplifiers for this frequency range. These amplifiers are designed to amplify in the US direction, and therefore the amplifier may be |

-continued

Frequency Ranges

| Frequency Range | Advantages | Disadvantages |
|---|---|---|
| | | saturated. Low attenuation of the coax cable increases the size of branches. |
| 42–88 MHz | Not used by DOCSIS and by TV, as these frequencies are the gap between DOCSIS US channels to TV channels and DOCSIS DS channels. | This range is not free all over the world. For example, in the DEVIC standard, this range is reduced. The cable network contains amplifiers for part of this frequency-range that are designed to amplify in the US direction. These amplifiers may therefore be saturated. |
| 88–860 MHz | The standard tuner can be used. The capacity is not limited. There is good isolation between different home segments; therefore, branch separation can be used. | The TV channels and DOCSIS channels use this frequency-range; therefore, the cable companies probably prefer to use this resource for the TV and DOCSIS channels. |
| >860 MHz | Not used by DOCSIS or TV channels. There is good isolation between different home segments, due to non-matched impedance ($Z_0$). There are existing chips, at low price, that supply two-direction filtering and tuner functionality. | The attenuation is high, therefore there are distance limitations at very high frequencies, although this distance limitation should not be relevant to home networking. There are some FCC limitations; however, these limitations are not believed to be relevant for coaxial wires. |

Various types of modulation can be used according to this embodiment of the invention. The particular modulation used should, of course, be one that can be used in the desired frequency range, that supports high bandwidth data rate (>10 Mbps), and that supports bursts with short learning time. Examples of modulation types that meet these requirements are QPSK and QAM.

Preferably, the channel allocation method should be Frequency Division Multiplexing (FDM), providing a specific frequency for each home network. There are some alternatives for channel allocation. The mechanism of channel allocation should answer the problem that a sub-network ("branch") usually contains some home networks. The number of home networks that should use the same frequency range can be changed. according to the physical layer condition i.e. according to the 'branch' size. There are some known methods to allocate channels for each home-network. It is contemplated that combinations of two base methods (e.g. combination of FDM and TDM) are not required in the home networking scenario.

Frequency Domain Multiplexing (FDM) is advantageous because of its simplicity, and its ability to be updated according to the number of home networks that share the same frequency, and according to the required bandwidth. FDM can use a wide spectrum for the entire solution, when each home is required to use only a narrow range such as less than 6 MHz. FDM is efficient, especially when the number of home networks in a branch is low, and this approach does not require synchronization or CMTS for synchronization. However, FDM is not efficient if many home networks share the same branch, although this case is expected to be rare. FDM is also constant-bit-rate (CBR) based, and is not affective for other types of traffic.

FDM with frequency-hopping is advantageous because it does not require configuration of the frequency that each home is to use, and is also very efficient for available bit rate (ABR) traffic. These advantages are not available, however, for branches having only a single home. In addition, this approach is more complex than FDM, and is difficult to manage by the cable system operator. It is also not efficient for constant bit rate traffic, such as in the example of the communication of a digital movie from a DVD player in one room to a television set in another room.

Time domain multiplexing (TDM) has the advantage that its bandwidth allocation can be dynamic, and allocated as needed. Of course, this is not a factor for branches having only single homes. However, TDM requires synchronization, and CMTS to accomplish this synchronization. TDM cannot also use the wide spectrum (>10 MHz) that is available in each channel group, and increases the complexity of the home cable network equipment because of the synchronization requirement.

Code domain multiplexing (CDM) is advantageous because of its ability to dynamically supply bandwidth as needed; of course, this advantage is not present for single-home branches. CDM is quite complex, however, and requires synchronization (CMTS). The CDM home cable network equipment will be quite complex, due to the synchronization requirement, and the wide spectrum available cannot be utilized. Performance will be generally quite low, unless the equipment is made even more complex to support wide spectrum sampling.

The data link protocol should be the IEEE 802.11 MAC layer CSMA/CA. This CSMA/CA can be used with or without ACK protocol. The need for immediate ACK should be verified according to the quality of the infrastructure. Some options to define the layer two (data link) protocol include consideration that the number of stations using home network is variable, typically between two and fifteen, and that stations can be added to or removed from the network during home network operation. Collision prevention is required, because collision detection in the QAILVI technology is complex. It is preferable that all the components will be similar, so that the home network will not require a special head component This method usually increases the robustness of the network, and does not require special addition of equipment. In any event, a standard protocol or protocol that is close to a standard protocol is preferred. Examples of protocols that comply with these requirements include 802.11 MAC layer CSMA/CA, and Token Bus 802.4. The 802.11 MAC layer CSMA/CA protocol is used today by many vendors, usually, in the wireless LAN equipment. Consider the fact that Bluetooth interface might be required to be exist on the HCNM/HCNU/HCNI components, it would be much simpler to support a single MAC protocol. This protocol also supports priority. The Token Bus 802.4 protocol is not common, and it is very complex. Building a reduced version of this protocol can simplify the protocol, but it will not be a standard protocol.

System security is done in layer two. This security can be based on the DOCSIS or IEEE 802.11 standards. The DOCSIS standard is preferred, because the CMTS headend already manages security in this manner. The standard CM already contains these cores, also.

Priority should be separately defined for the two channels (cable modem and home network). The priority for the cable modem channel is included in cable modem protocols such as DOCSIS 1.1, which include capability for services such as Voice over IP that require priority handling. The priority for the home networking channel is divided into two aspects. Priority is required in the home networking channel for applications that are required to be connected to the standard cable modem channel; but that are using the home networking as transport media; in this case, these applications should use HCNM and not HCNU/HCINI, and should use the cable modem channel directly. Applications at home may have varying priority, such as CBR priority for transferring video signals from a DVD reader to a digital TV elsewhere in the home, high priority for games, and low priority for backup. While priority requirements for such operation can be developed, the high data rate of the home network according to this embodiment of the invention is contemplated to be sufficiently high that a "best efforts" approach should suffice.

As compared to the HomePNA phoneline network technology, it is contemplated that the HomeCN home cable network according to the preferred embodiments of the invention will be particularly advantageous. The HomeCN network uses existing TV cable interfaces, which are at good locations for entertainment systems such as televisions, VCR, and DVD equipment. Installation and use are contemplated to be simple for the HomeCN network, typically not requiring changes in the home wiring. Higher bandwidth operation can be achieved by the simple adding of a notch filter, as described above. The overall cost of the HomeCN equipment is contemplated to be about the same as that for HomePNA equipment. User privacy can be provided through use of a notch filter, and the HomeCNA equipment will not interfere with VDSL communications as can the HomePNA signals. The capacity achievable by the HomeCN technology is contemplated to be at least 20 Mbps, even for a Single Home low cost implementation, as compared to a maximum of 10 Mbps for HomePNA; the higher capacity is expected because of the high signal quality that can be carried on the coaxial cabling.

Figure 14:
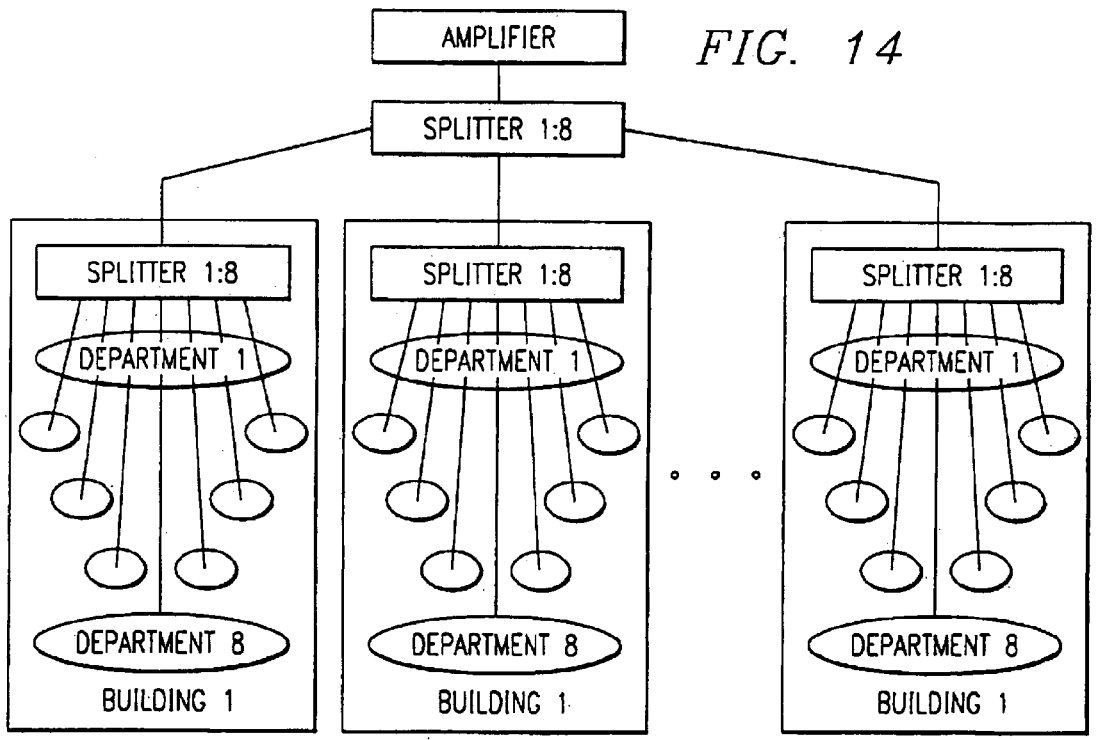
FIG. 14 shows neighborhood wiring.
Figure 15:
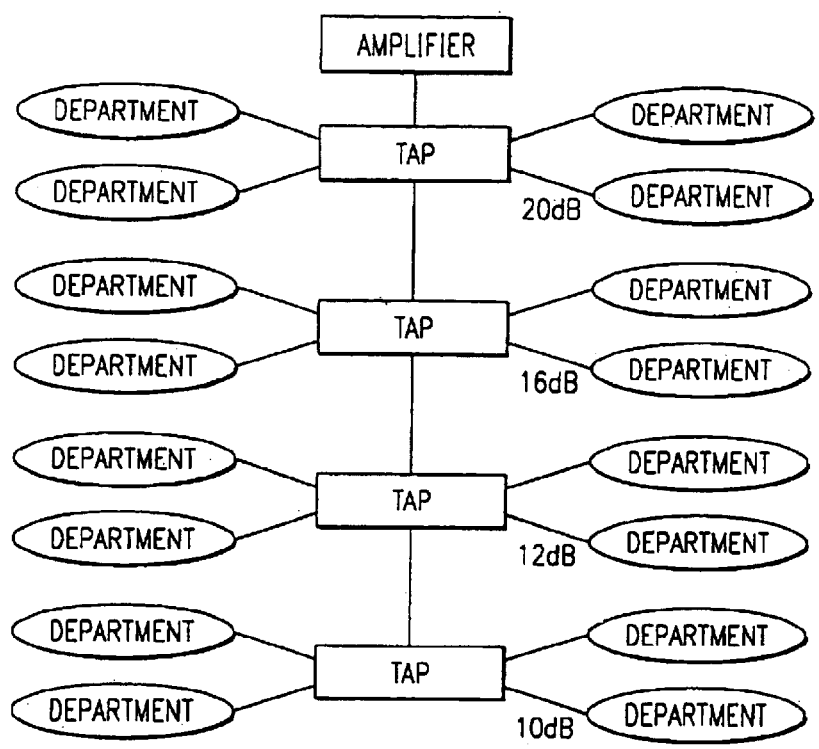
FIG. 15 shows building wiring.
Figure 16:
FIG. 16 and FIG. 17 show home wirings.
Figure 17:
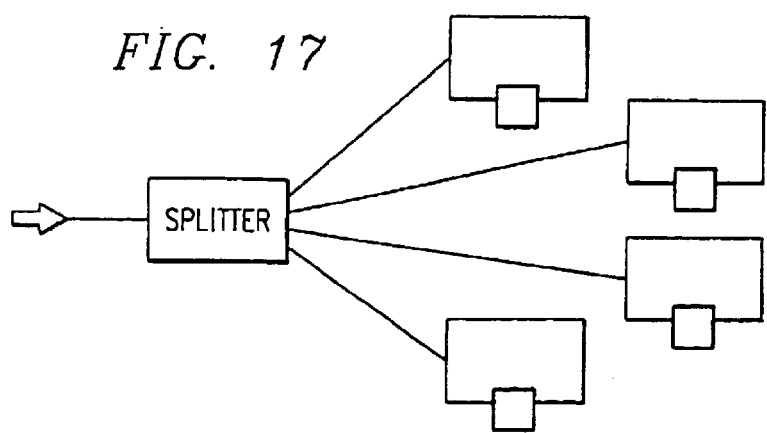

FIGS. 14 through 17 illustrate, in block diagram form, examples of typical street and building wiring implementations of the home networking technology, according to the preferred embodiments of the invention. FIG. 14 illustrates an example of a a wiring arrangement in a neighborhood that contains some small apartment buildings. FIG. 15 illustrates an example of a wiring arrangement in a large apartment building. FIG. 16 illustrates an example of a column-based wiring arrangement for a home network, while FIG. 17 illustrates an example of a tree-based wiring installation for a home network.

Figure 18:
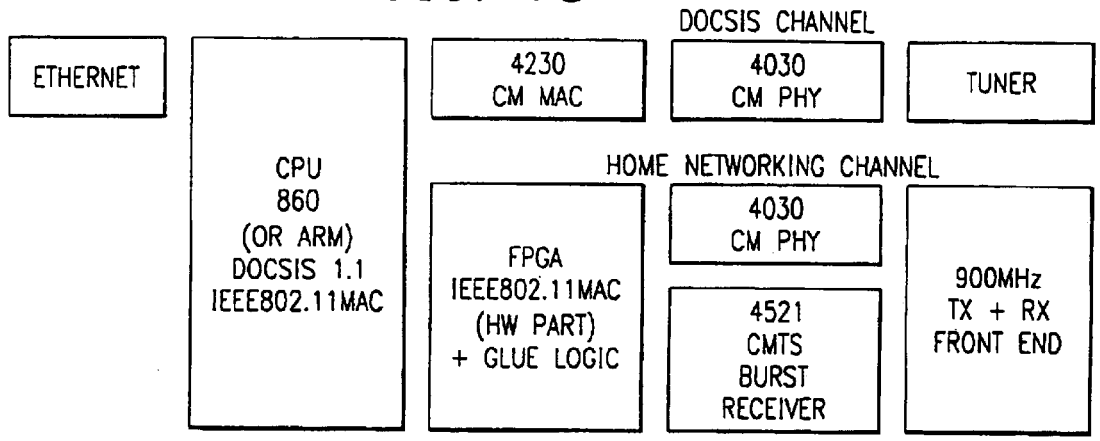
FIG. 18 and FIG. 19 depict examples of an HCNM and HNCU.
Figure 19:
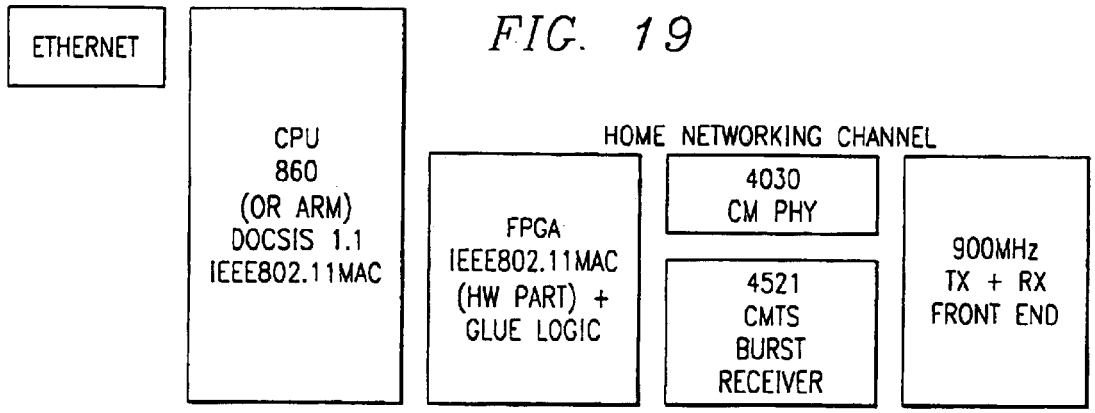

It is further contemplated that the HCNM and HCNU systems can be designed into a single-chip, "system on a chip" architecture, examples of which are illustrated in FIGS. 18 and 19. FIG. 18 illustrates an architecture for the HCNM including both the DOCSIS cable modem and home networking channels, while the example of FIG. 19 illustrates an architecture for the HCNU including capability only for the home networking channel. In each case, component circuit functions to be included in the architecture include a burst receiver and a burst transmitter, 900 MHz transmit and receive front end circuitry, Media Access Control (MAC) circuitry, such as based on 802.11 and that supports HomeCN and Bluetooth, Bluetooth interface circuitry, and a CPU core (such as an ARM processor). It is contemplated, in the preferred embodiment of the invention, that the single chip HCNM systems should support specific communication frequencies of 900 to 906 MHz, and transmission rates of up to 30 MBps.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of managing communications among a plurality of premise installations in a cable communications distribution system, the cable distribution system including at least one splitter for spreading communicated signals from a headend to a plurality of branches, each of the plurality of branches having at least one premise installation, the method comprising the steps of:

determining an attenuation parameter for each of a plurality of components in the distribution system;

determining an isolation parameter between branches coupled to the at least one splitter;

calculating an overall signal attenuation over a selected frequency band between premise installations on different ones of the plurality of branches; and responsive to the overall signal attenuation exceeding a minimum isolation threshold value between first and second branches, assigning a frequency within the selected frequency band to a premise installation on each of the first and second branches.

2. The method of claim 1, wherein each of the premise installations includes a splitter.

3. The method of claim 2, wherein the cable communications distribution system includes a fiber optic facility extending from the headend to a street splitter having a fiber-to-coaxial interface.

4. The method of claim 2, wherein at least one of the premise installations includes a notch filter.

5. The method of claim 2, wherein at least one of the splitters of at least one of the premise installations includes an amplifier.

6. The method of claim 1, wherein the determining steps are performed by a priori knowledge of attenuation and isolation parameters of components in the cable distribution system.

7. The method of claim 6, further comprising:

establishing a set of basic rules corresponding to known network configurations, responsive to the determining and calculating steps;

wherein the assigning step is performed responsive to comparing the system to the basic rules.

8. The method of claim 1, wherein the determining step comprises:

operating the cable distribution; and measuring the attenuation and isolation parameters using spectrum measurement equipment.

9. The method of claim 1, wherein each of the premise installation includes a home cable network modem having a branch calculation operational mode;

wherein the step of determining an isolation parameter comprises:

transmitting a signal from one of the home cable network modems, the transmitted signal comprising a known pattern at a specific power and frequency;

measuring the power of the transmitted signal at each of the home cable network modems; and building a topology database from the measured isolation among the home cable network modems.

10. The method of claim 1, wherein the frequency band consists of frequencies above 860 MHz.

11. The method of claim 1, wherein at least one of the premise installations includes a transponder, for receiving signals transmitted from within the premise installation at a first frequency, and for retransmitting the received signals at a second frequency;

wherein the assigning step assigns the first and second frequencies to the at least one of the premise installations having the transponder.

* * * * *